United States Patent
Sienel et al.

(10) Patent No.: US 7,370,483 B2
(45) Date of Patent: May 13, 2008

(54) REFRIGERANT CYCLE WITH THREE-WAY SERVICE VALVE FOR ENVIRONMENTALLY FRIENDLY REFRIGERANT

(75) Inventors: Tobias H. Sienel, East Hampton, MA (US); Yu Chen, East Hartford, CT (US)

(73) Assignee: Carrier Corporation, Farmington, CT (US)

( * ) Notice: Subject to any disclaimer, the term of this patent is extended or adjusted under 35 U.S.C. 154(b) by 524 days.

(21) Appl. No.: 11/062,706

(22) Filed: Feb. 22, 2005

(65) Prior Publication Data

US 2006/0185380 A1    Aug. 24, 2006

(51) Int. Cl.
*F25B 45/00* (2006.01)
(52) U.S. Cl. ............................. 62/77; 62/149; 62/174; 62/292; 62/324.4
(58) Field of Classification Search .................... 62/77, 62/149, 174, 292, 324.4
See application file for complete search history.

(56) References Cited

U.S. PATENT DOCUMENTS

| | | | |
|---|---|---|---|
| 4,175,400 A | 11/1979 | Edwards et al. | |
| 4,644,973 A | 2/1987 | Itoh et al. | |
| 5,167,126 A | 12/1992 | Cartwright | |
| 5,377,493 A * | 1/1995 | Friedland | 62/77 |
| 7,096,679 B2 * | 8/2006 | Manole | 62/115 |
| 2003/0116740 A1 | 6/2003 | Schroeder et al. | |
| 2003/0213516 A1 | 11/2003 | Hirota et al. | |

FOREIGN PATENT DOCUMENTS

JP    2003049960    2/2003

OTHER PUBLICATIONS

International Search Report and Written Opinion dated Sep. 27, 2007.

* cited by examiner

*Primary Examiner*—Marc Norman
(74) *Attorney, Agent, or Firm*—Carlson, Gaskey & Olds

(57) ABSTRACT

A refrigerant cycle is provided with a single three-way service valve that is utilized for draining and adding refrigerant. In the prior art, a second two-way valve was used in combination with the three-way valve. The present invention simply drains the refrigerant, and does not need to return the refrigerant. The present invention is particularly well suited for use with an environmentally benign refrigerant such as $CO_2$.

4 Claims, 1 Drawing Sheet

REFRIGERANT CYCLE WITH THREE-WAY SERVICE VALVE FOR ENVIRONMENTALLY FRIENDLY REFRIGERANT

BACKGROUND OF THE INVENTION

This invention relates to a method of utilizing a three-way valve to provide simplified servicing to a refrigerant cycle, in a manner that allows the elimination of a second valve that was required in the prior art.

Refrigerant cycles are typically utilized to compress a refrigerant, and then pass that refrigerant through a series of heat exchangers to condition a fluid. Typically, a compressor compresses a refrigerant and delivers it to a condenser at which heat is rejected. From the condenser, the refrigerant passes to an expansion device, and from the expansion device to an evaporator. At the evaporator, the refrigerant takes in heat. As an example, in an air conditioning mode, the evaporator is utilized to cool air that is being delivered into an environment. Refrigerant cycles are also utilized to heat water for a hot water supply, and for many other applications.

In the prior art, the refrigerant that circulated through the refrigerant cycle tended to be Freon, or another refrigerant that could not be exposed to the environment. Thus, strict controls were in place to reduce the likelihood of any leakage of the refrigerant into the environment. One challenge for the refrigerant cycle designer in the past occurred when refrigerant was removed or added to the system. In the prior at, a pair of service valves were utilized with one valve on each side of the expansion valve. The valves were opened to allow refrigerant to flow outwardly of the system, and a recovery system was placed onto the two valve ports such that liquid refrigerant could be removed, with a vapor being returned. This complex system was necessary to minimize any possibility of leakage.

More recently, environmentally benign refrigerant such as CO2 have been developed. With the environmentally benign refrigerants, there is little concern with regard to leakage of refrigerant to the environment.

SUMMARY OF THE INVENTION

In the disclosed embodiment of this invention, the service function for a refrigerant cycle utilizing an environmentally benign refrigerant includes a single three-way valve. The single three-way valve may be in a closed position allowing normal operation of the refrigerant cycle. Further, for a pressure test position, the three-way valve may be moved to isolate a low pressure side of the refrigerant cycle. Finally, for adding or withdrawing refrigerant from the refrigerant cycle, the three-way valve may be moved to an intermediate position at which it allows communication between a port leading outside of the refrigerant cycle to refrigerant lines leading in both directions. The present invention thus provides a method of withdrawing refrigerant from a refrigerant cycle without having to return this refrigerant at all. Further, by utilizing this method, the present invention eliminates the need for a second valve.

These and other features of the present invention can be best understood from the following specification and drawings, the following of which is a brief description.

DETAILED DESCRIPTION OF THE PREFERRED EMBODIMENT

Figure 1:
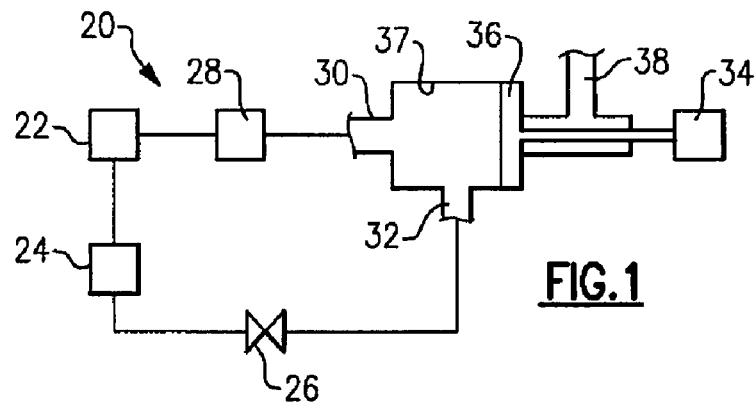
FIG. 1 shows a schematic refrigerant cycle incorporating an inventive service valve.

A refrigerant cycle 20 is illustrated in FIG. 1. A compressor 22 compresses the refrigerant and delivers it downstream to a condenser 24. From the condenser 24, the refrigerant passes to an expansion device 26. The refrigerant passes through a pair of refrigerant lines 32 and 30 to an evaporator 28. As is known, the evaporator serves to condition air being delivered into an environment if the refrigerant cycle 20 is an air conditioner. The condenser 24 heats water in a hot water heating system.

A service valve control 34 drives a three-way valve 36 for controlling communication between lines 30 and/or 32 and an outlet port 38. As shown in FIG. 1, the valve 36 sits against a face of a valve chamber 37, and blocks any flow of refrigerant from either of line 32 or 30 to port 38. This is the position the valve will maintain during normal operation of the refrigerant cycle 20.

Figure 2:
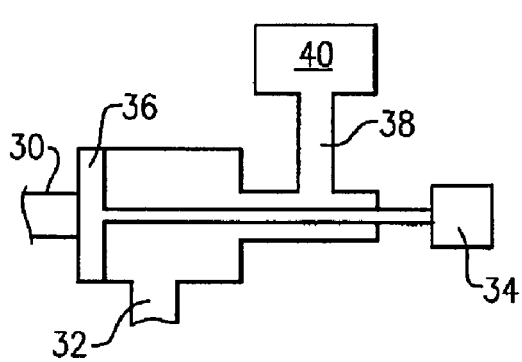
FIG. 2 shows another mode of operation of the inventive service valve.

FIG. 2 shows the valve control 34 having moved the valve 36 to a position such that line 32 can communicate with the port 38 but line 30 cannot. A component 40 is shown attached to the port 38 in the FIG. 2 position. The component 40 may be a pressure test component, such that the pressure within the refrigerant cycle 20 can be tested. The FIG. 1 and FIG. 2 positions were also utilized in the prior art.

Figure 3:
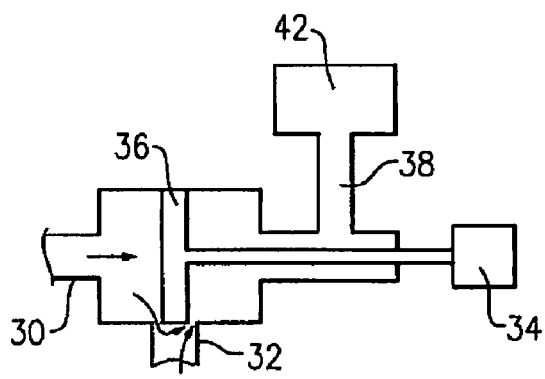
FIG. 3 shows yet another mode of operation of the inventive service valve.

The FIG. 3 position shows the valve 36 at an intermediate position such that both lines 30 and 32 communicate with the port 38. A component 42 is shown attached to the port 38. The component 42 may be a charging container that will inject refrigerant into the refrigerant cycle 20, through both lines 30 and 32. Alternatively, if the refrigerant is being removed from the refrigerant cycle 20, then the valve 36 is put in this position and refrigerant can pass from both lines 30 and 32 into the port 38. In this inventive method, the refrigerant is simply drained from the refrigerant cycle 20, and is not returned as was the case in the prior art.

Figure 4:
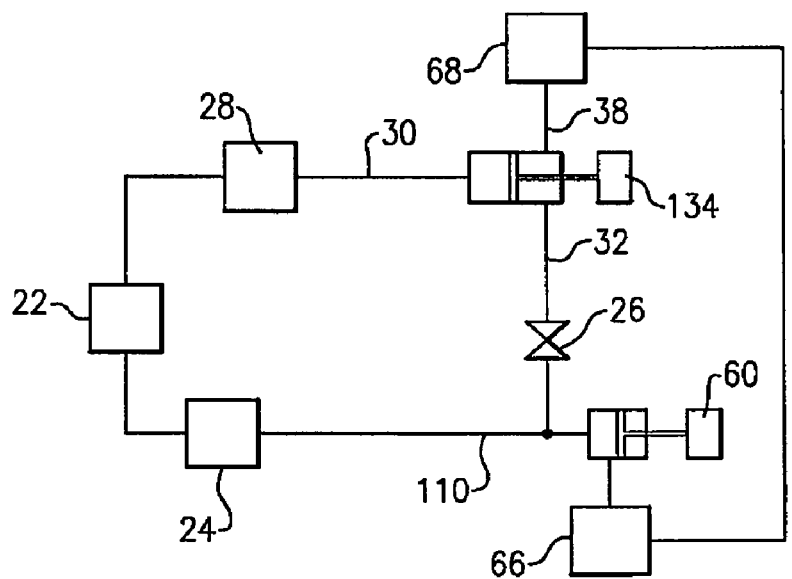
FIG. 4 shows a prior art refrigerant cycle.

The prior art refrigerant cycle 70 is illustrated in FIG. 4. As shown, the three-way valve 134 is also associated with a second, two-way valve 60 that is movable within a valve chamber 62. Normally, the valve 60 is maintained against the left-hand face of the chamber 62, such that the port 64 does not communicate with a fluid line 110. Instead, refrigerant can flow through the normal refrigerant cycle. However, in the position shown in FIG. 4, refrigerant is being withdrawn from the refrigerant cycle 70. The recovery systems 66 and 68 are attached to the ports 64 and 38. Refrigerant is removed, and passed through a liquid separator. The liquid refrigerant is removed and a return flow is sent back into the port 38. The returned refrigerant includes a vaporous refrigerant. The refrigerant continues to be cycled through the system, and out of the port 64 until it has all been removed in a liquid state.

The present invention is directed to a method of removing refrigerant utilizing only a three-way valve, and is particularly well suited for a refrigerant cycle wherein the refrigerant is environmentally benign. In a disclosed embodiment, the environmentally benign refrigerant is CO2. With the inventive method, the two-way valve 60 is eliminated. The present invention thus simplifies the prior art, and provides a more cost-effective refrigerant cycle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant system comprising:

a compressor;

a heat rejecting heat exchanger, an expansion device, and a heat absorbing heat exchanger; and wherein a single service valve is provided between the heat rejecting heat exchanger and the heat absorbing heat exchanger, said valve having a first fluid line communicating to an upstream pressure, a second fluid line communicating to a downstream pressure, said valve providing the function of allowing flow to pass through the valve while blocking flow from reaching a discharge port when in a fully closed position, allowing flow from said first fluid line and said second fluid line to reach said discharge port when in an intermediate position, and allowing flow from said first fluid line, but blocking flow from said second fluid line from reaching said discharge port in a fully open position.

2. The system as set forth in claim 1, wherein said refrigerant is $CO_2$.

3. A method of servicing a refrigerant cycle comprising the steps of:

(1) providing a first fluid line communicating from an location after a heat rejecting heat exchanger to a valve chamber, and a second fluid line communicating from said valve chamber to a downstream heat absorbing heat exchanger, placing a moving valve capable of moving between a fully open, fully closed and intermediate position within said valve chamber, said valve blocking flow of refrigerant from either said first and second fluid lines to a discharge port when in said closed position, allowing flow of refrigerant from said first fluid line, but blocking flow of refrigerant from said second fluid line to said discharge port in a fully open position, and allowing communication between both said first and second fluid lines to said discharge port when in said intermediate position;

(2) moving said valve to said intermediate position and draining refrigerant from said refrigerant cycle, and not returning refrigerant to said refrigerant cycle until said draining of refrigerant has been complete.

4. The method as set forth in claim 3, wherein said refrigerant is $CO_2$.

* * * * *